(12) United States Patent
Kim et al.

(10) Patent No.: US 12,143,211 B2
(45) Date of Patent: *Nov. 12, 2024

(54) APPARATUS AND METHOD FOR TRANSMITTING CONTROL INFORMATION IN COMMUNICATION SYSTEM

(71) Applicant: Samsung Electronics Co., Ltd., Suwon-si (KR)

(72) Inventors: Kyungjoong Kim, Suwon-si (KR); Seho Myung, Suwon-si (KR); Hongsil Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,737

(22) Filed: Aug. 17, 2023

(65) Prior Publication Data
US 2023/0396359 A1 Dec. 7, 2023

Related U.S. Application Data

(63) Continuation of application No. 17/713,111, filed on Apr. 4, 2022, now Pat. No. 11,736,226, which is a
(Continued)

(30) Foreign Application Priority Data

Nov. 17, 2017 (KR) .......................... 10-2017-0154224

(51) Int. Cl.
*H04L 1/00* (2006.01)
*H04B 7/06* (2006.01)
(Continued)

(52) U.S. Cl.
CPC ......... *H04L 1/0026* (2013.01); *H04B 7/0632* (2013.01); *H04L 1/0003* (2013.01);
(Continued)

(58) Field of Classification Search
CPC ... H04L 1/0026; H04L 1/0003; H04L 1/0016; H04L 1/203; H04L 5/0057; H04L 1/0015; H04L 1/0023; H04B 7/0632
(Continued)

(56) References Cited

U.S. PATENT DOCUMENTS 9,755,814 B2    9/2017   Kang et al.
10,938,537 B2   3/2021   Rico Alvarino et al.
(Continued)

FOREIGN PATENT DOCUMENTS

CN    105099627 A    11/2015
CN    105794167 A     7/2016
(Continued)

OTHER PUBLICATIONS

International Search Report and Written Opinion of the International Searching Authority in connection with International Application No. PCT/KR2018/014088 dated Feb. 27, 2019, 11 pages.
(Continued)

*Primary Examiner* — Fitwi Y Hailegiorgis

(57) ABSTRACT

The disclosure relates to a pre-5th-generation (5G) or 5G communication system to be provided for supporting higher data rates beyond 4th-generation (4G) communication system such as long term evolution (LTE). An operating method of a user equipment (UE) in a communication system includes performing radio resource control (RRC) signaling with a base station, determining a code rate based on an RRC configuration according to the RRC signaling, and determining a size of data using the code rate.

20 Claims, 11 Drawing Sheets

Related U.S. Application Data continuation of application No. 15/733,093, filed as application No. PCT/KR2018/014088 on Nov. 16, 2018, now Pat. No. 11,336,391.

(51) Int. Cl.
  *H04L 1/20* (2006.01)
  *H04L 5/00* (2006.01)
(52) U.S. Cl.
  CPC ............ *H04L 1/0016* (2013.01); *H04L 1/203* (2013.01); *H04L 5/0057* (2013.01)
(58) Field of Classification Search
  USPC .......................................................... 370/329
  See application file for complete search history.

(56) References Cited

U.S. PATENT DOCUMENTS

| | | |
|---|---|---|
| 2014/0192732 A1 | 7/2014 | Chen et al. |
| 2014/0313985 A1 | 10/2014 | Nimbalker et al. |
| 2015/0016553 A1 | 1/2015 | Yang et al. |
| 2015/0195819 A1 | 7/2015 | Kwon et al. |
| 2015/0271693 A1 | 9/2015 | Kang et al. |
| 2015/0341912 A1 | 11/2015 | Kim et al. |
| 2015/0372784 A1 | 12/2015 | Xu et al. |
| 2015/0381310 A1 | 12/2015 | Hammarwall et al. |
| 2016/0323855 A1 | 11/2016 | Nakamura et al. |
| 2019/0081727 A1 | 3/2019 | Feng |
| 2020/0313795 A1* | 10/2020 | Xu ........................ H04B 7/0628 |
| 2020/0323031 A1* | 10/2020 | Nakamura ............ H04W 80/08 |

FOREIGN PATENT DOCUMENTS

| | | |
|---|---|---|
| CN | 105960787 A | 9/2016 |
| KR | 10-2015-0111820 A1 | 10/2015 |
| WO | 2015/020587 A | 2/2015 |
| WO | 2016/028102 A1 | 2/2016 |

OTHER PUBLICATIONS

3GPP TS 38.214 V15.9.0 (Mar. 2020), Technical Specification, 3rd Generation Partnership Project; Technical Specification Group Radio Access Network; NR; Physical layer procedures for data (Release 15), Mar. 2020, 107 pages.

Intel Corporation, "On link adaptation enhancements to support URLLC," R1-1717399, 3GPP TSG RAN WG1 Meeting #90bis, Prague, Czech Republic, Oct. 9-13, 2017, 5 pages.

LG Electronics, "Discussions on CQI and MCS tables," R1-1717943, 3GPP TSG RAN WG1 Meeting #90bis, Prague, Czech Republic, Oct. 9-13, 2017, 5 pages.

Samsung, "CQI definition," R1-1720292, 3GPP TSG RAN WG1 Meeting #91, Reno, USA Nov. 27-Dec. 1, 2017, 9 pages.

Zte, et al., "On CQI and MCS," R1-1717426, 3GPP TSG-RAN WG1 Meeting #90bis, Prague, Czech Republic, Oct. 9-13, 2017, 9 pages.

ZTE, "CQI and MCS table design for 1024QAM," R1-1717443, 3GPP TSG-RAN WG1 Meeting #90bis, Prague, Czech Republic, Oct. 9-13, 2017, 8 pages.

Supplementary European Search Report dated Nov. 18, 2020 in connection with European Patent Application No. 18 87 7685, 7 pages.

Notice of Preliminary Rejection dated Nov. 25, 2021, in connection with Korean Application No. 10-2017-0154224, 14 pages.

Intellectual Property India, "Examination report under sections 12 & 13 of the Patents Act" issued Mar. 24, 2022, in connection with Indian Patent Application No. 202017021051, 6 pages.

Office Action dated Nov. 16, 2022 in connection with Chinese Patent Application No. 201880074175.3, 29 pages.

Notice of Patent Grant dated Oct. 16, 2022 in connection with Korean Patent Application No. 10-2017-0154224, 4 pages.

* cited by examiner

APPARATUS AND METHOD FOR TRANSMITTING CONTROL INFORMATION IN COMMUNICATION SYSTEM

CROSS-REFERENCE TO RELATED APPLICATIONS

This application is a continuation of application Ser. No. 17/713,111, filed Apr. 4, 2022, now U.S. Pat. No. 11,736,226, which is a continuation of application Ser. No. 15/733,093, filed May 14, 2020, now U.S. Pat. No. 11,336,391, which is the 371 National Stage of International Application No. PCT/KR2018/014088, filed Nov. 16, 2018, which claims priority to Korean Patent Application No. 10-2017-0154224, filed Nov. 17, 2017, the disclosures of which are hereby incorporated by reference in their entirety.

BACKGROUND

1. Field

The present disclosure generally relates to a communication system, and more specifically, to an apparatus and method for transmitting and receiving control information in the communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FOAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Meanwhile, new radio (NR) which is new 5G communication is designed to freely multiplex various services in time and frequency resources, and accordingly waveform/numerology and a reference signal may be allocated dynamically or freely based on need of a corresponding service. Data transmission optimized through measurement of a channel quality and an interference amount is important to provide an optimal service to a terminal in the communication, and accordingly accurate channel state measurement is essential. However, unlike the 4G communication where channel and interference characteristics do not significantly change according to the frequency resource, since channel and interference characteristics in a 5G channel considerably change according to the service, it is necessary to support a subset in a frequency resource group (FRG) for dividing and measuring them. Meanwhile, the type of services supported in the NR system may be divided to categories such as enhanced mobile broadband (eMBB), massive machine type communications (mMTC), ultra-reliable and low-latency communications (URLLC), and so on. The eMBB may be a service aiming for fast transmission of high-capacity data, the mMTC may be a service aiming for terminal power minimization and access of multiple terminals, and the URLLC may be a service aiming for high reliability and low delay. Depending on the type of the service applied to the terminal, different requirements may be applied.

A plurality of services may be provided to a user in the communication system as above, and what is demanded is a method for providing each service for the characteristics within the same time period to provide such services to the user and an apparatus using the same.

SUMMARY

Based on the discussions described above, the present disclosure provides an apparatus and a method for generating a channel quality indicator (CQI) and modulation and coding scheme (MCS) table in a wireless communication system requiring various block error rate (BLER) targets.

According to various embodiments of the present disclosure, an operating method of a user equipment (UE) in a communication system includes performing radio resource control (RRC) signaling with a base station, determining a code rate based on an RRC configuration according to the RRC signaling, and determining a size of data using the code rate.

According to various embodiments of the present disclosure, an apparatus of a UE in a communication system includes a transceiver, and at least one processor functionally coupled with the transceiver. The at least one processor performs RRC signaling with a base station, determines a code rate based on an RRC configuration according to the RRC signaling, and determines a size of data using the code rate.

An apparatus and a method according to various embodiments of the present disclosure may increase system transmission efficiency and efficiently acquire a transport block size (TBS) using a plurality of channel quality indicator (CQI) and modulation and coding scheme (MCS) tables for supporting various scenarios.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure-+ should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for transmitting and receiving control information in a wireless communication system. Specifically, the present disclosure explains a technique for transmitting and receiving the control information based on a channel quality indicator (CQI) and modulation and coding scheme (MC S) table in the wireless communication system.

Terms indicating signals, terms indicating channels, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., 3rd generation partnership project (3GPP)), which are merely exemplary for explanations. Various embodiments of the present disclosure may be easily modified and applied in other communication systems.

Figure 1:
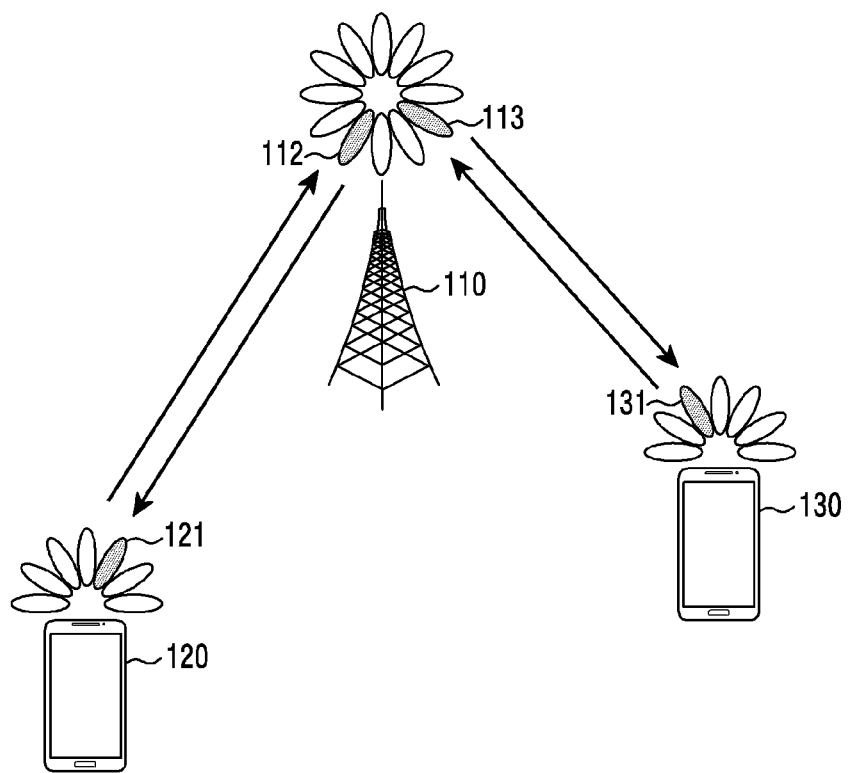
FIG. 1 illustrates a wireless communication system according to various embodiments of the present disclosure.

FIG. 1 illustrates a wireless communication system according to various embodiments of the present disclosure. FIG. 1 depicts a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an access point (AP), an eNodeB (eNB), a 5th generation node (5G node), a wireless point, a transmission/reception point (TRP), or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receiver parameter.

Figure 2:
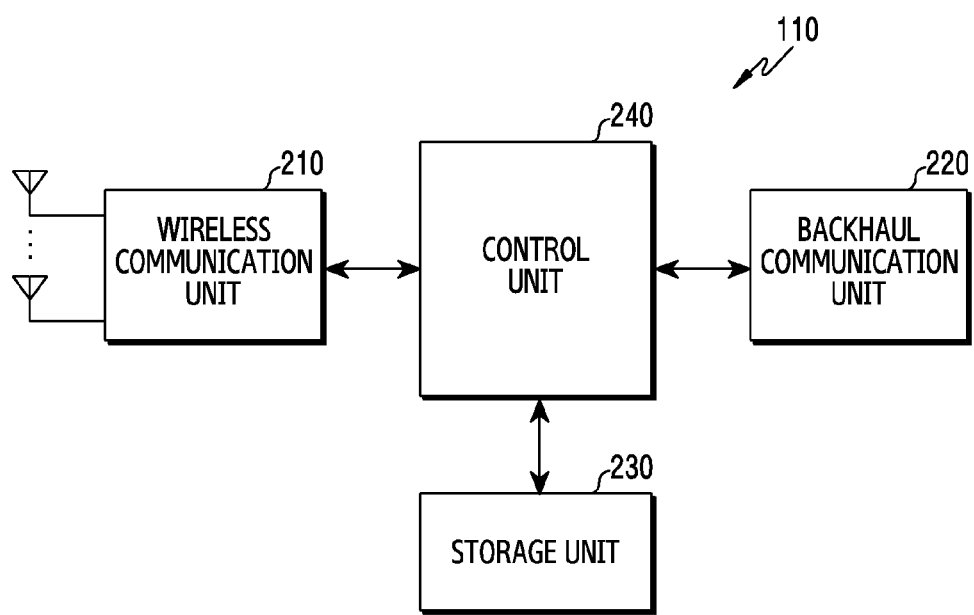
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 210 transmits and receives the signals as stated above. Hence, whole or part of the wireless communication unit 210 may be referred to as 'a transmitter', 'a receiver', or 'a transceiver'. Also, in the following, the transmission and the reception over the radio channel is used as the meaning which embraces the above-stated processing of the wireless communication unit 210. In some embodiments, the wireless communication unit 210 may perform functions for transmitting and receiving a signal using wired communication.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to another embodiment, the protocol stack may be included in the wireless communication unit 210. For doing so, the control unit 240 may include at least one processor.

According to various embodiments, the control unit 240 may perform radio resource control (RRC) signaling with the terminal 120. For example, the control unit 240 may control the base station to perform operations according to various embodiments, to be described.

Figure 3:
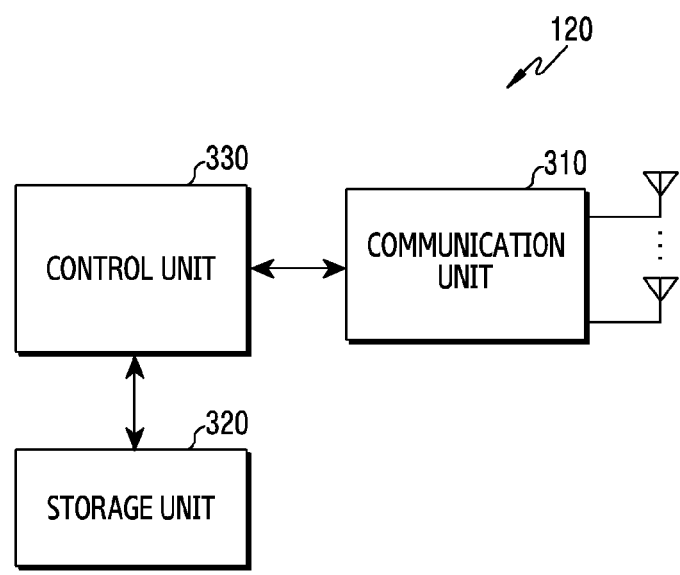
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as 'portion' or '~er' used hereafter indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the wireless communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

In addition, the communication unit 310 may include different communication modules for processing signals of different frequency bands. Further, the communication unit 310 may include a plurality of communication modules for supporting different radio access technologies. For example, different radio access technologies may include Bluetooth low energy (BLE), wireless fidelity (Wi-Fi), WiFi Gigabyte (WiGig), and a cellular network (e.g., Long Term Evolution (LTE)). Also, different frequency bands may include a super high frequency (SHF) (e.g., 2.5 GHz, 5 GHz) band and a millimeter weave (e.g., 60 GHz) band.

The communication unit 310 transmits and receives the signals as stated above. Hence, whole or part of the communication unit 310 may be referred to as 'a transmitter', 'a receiver', or 'a transceiver'. In addition, the transmission and the reception over the radio channel are used as the meaning which embraces the above-stated processing of the communication unit 310 in the following explanations. In some embodiments, the communication unit 310 may perform functions for transmitting and receiving a signal using wired communication.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. In addition, part of the communication unit 310 and the control unit 330 may be referred to as a communication processor (CP).

According to various embodiments, the control unit 330 may perform the RRC signaling a base station, determine a code rate based on an RRC configuration according to the RRC signaling, and determine a size of data using the code rate. For example, the control unit 330 may control the terminal to carry out operations to be explained according to various embodiments.

Figure 4A:
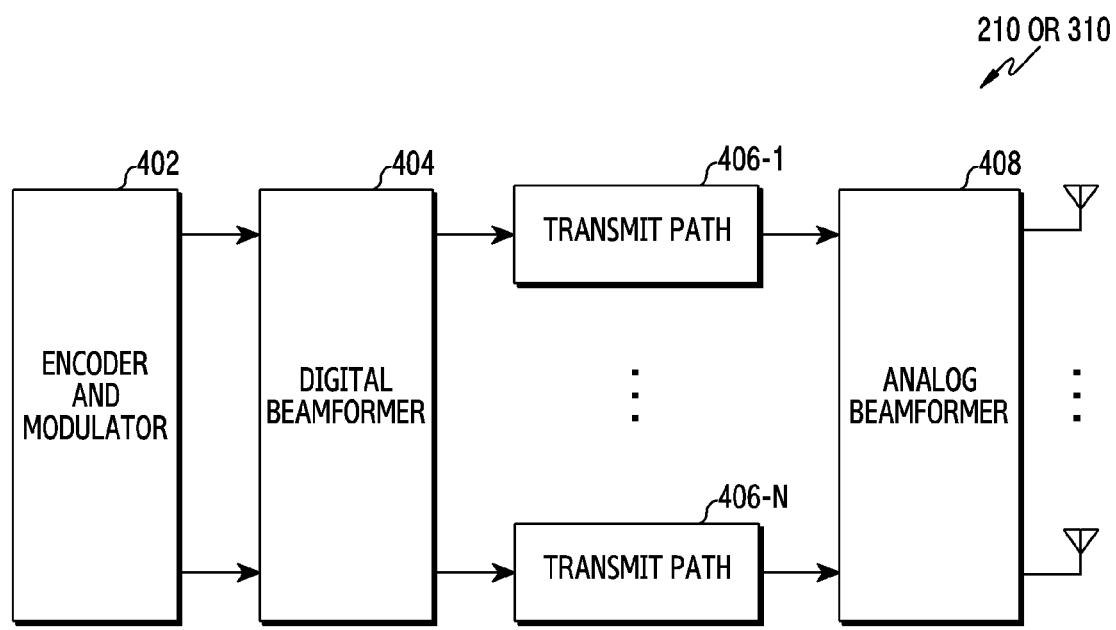
FIGS. 4A through 4C illustrate a configuration of a communication unit in a wireless communication system according to various embodiments of the present disclosure.
Figure 4B:
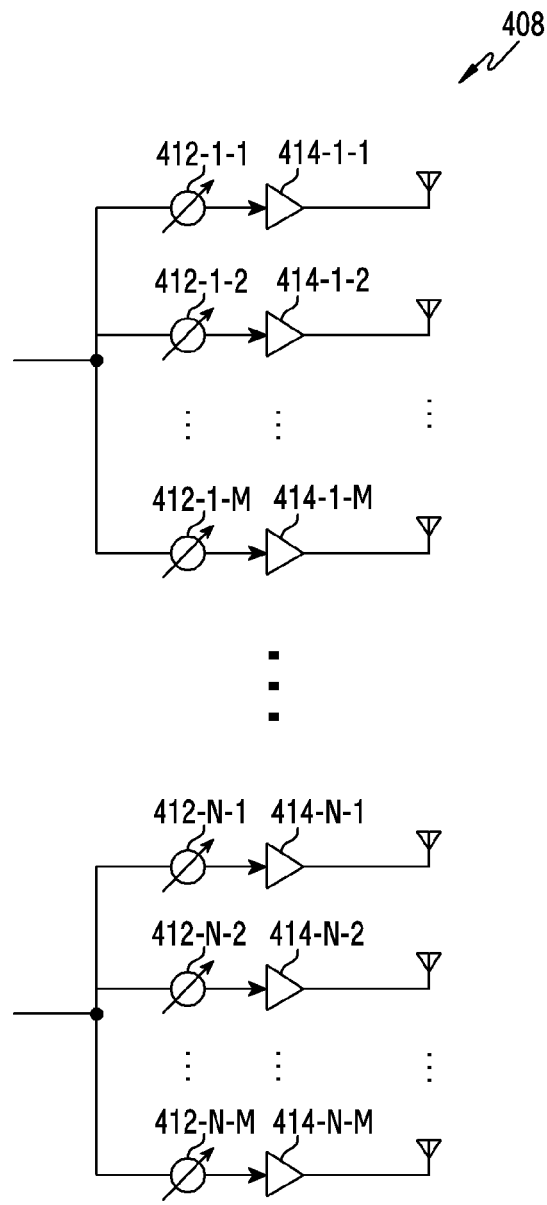
Figure 4C:
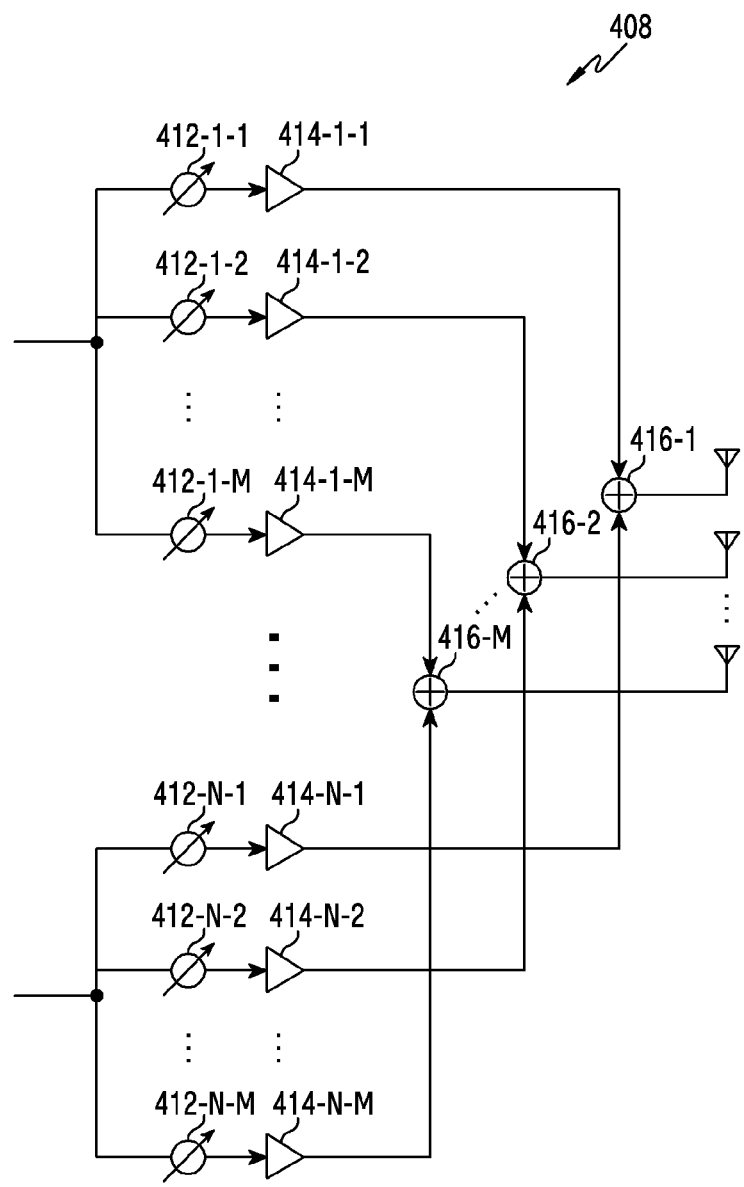

FIG. 4A through 4C illustrate a configuration of a communication unit in a wireless communication system according to various embodiments of the disclosure. FIG. 4A through 4C depict an example of a detailed configuration of the wireless communication unit 210 of FIG. 2 or the communication unit 310 of FIG. 3. More specifically, FIG. 4A through 4C depict components for performing the beamforming, as part of the wireless communication unit 210 of FIG. 2 or the communication unit 310 of FIG. 3.

Referring to FIG. 4A, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols by performing constellation mapping.

The digital beamformer 404 beamforms a digital signal (e.g., the modulation symbols). For doing so, the digital beamformer 404 multiplies the modulation symbols by beamforming weights. Herein, the beamforming weights are used to change an amplitude and a phase of the signal, and may be referred to as a 'precoding matrix' or a 'precoder'. The digital beamformer 404 outputs the digital-beamformed modulation symbols to the transmit paths 406-1 through 406-N. In so doing, according to a multiple input multiple output (MIMO) transmission scheme, the modulation symbols may be multiplexed or the same modulation symbols may be provided to the transmit paths 406-1 through 406-N.

The transmit paths 406-1 through 406-N convert the digital-beamformed digital signals to analog signals. For doing, the transmit paths 406-1 through 406-N each may include an inverse fast Fourier transform (IFFT) operator, a cyclic prefix (CP) adder, a DAC, and an up-converter. The CP adder is used for an orthogonal frequency division multiplexing (OFDM) scheme, and may be excluded if another physical layer scheme (e.g., filter bank multi-carrier (FBMC)) is applied. That is, the transmit paths 406-1 through 406-N provide an independent signal process for a plurality of streams generated through the digital beamforming. Yet, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals inputted to the analog beamformer 408 are converted in phase/amplitude, amplified, and transmitted via the antennas. In so doing, the signal of each path is transmitted via different antenna sets, that is, antenna arrays. A signal inputted in a first path is converted by phase/amplitude converters 412-1-1 through 412-1-M to a signal string having different or the same phase/amplitude, amplified by amplifiers 414-1-1 through 414-1-M, and then transmitted via the antennas.

Referring to FIG. 4C, signals inputted to the analog beamformer 408 are converted in phase/amplitude, amplified, and transmitted via antennas. In so doing, a signal of each path is transmitted via the same antenna set, that is, the same antenna array. A signal inputted in the first path is converted by the phase/magnitude converters 412-1-1 through 412-1-M to a signal string having different or the same phase/amplitude, and amplified by the amplifiers 414-1-1 through 414-1-M. To transmit via a single antenna array, the amplified signals are summed by adders 416-1-1 through 416-1-M based on the antenna element, and then transmitted via the antennas.

The independent antenna array is used per transmit path in FIG. 4B, and the transmit paths share the single antenna array in FIG. 4C. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

In the LTE system which is a representative example of a broadband wireless communication system, downlink adopts the OFDM scheme and uplink adopts single carrier (SC)-frequency division multiple access (FDMA) scheme. The multiple access scheme as described above distinguishes data or control information for each user by allocating and operating, so as not to overlap time-frequency resources for transmitting the data or the control information for each user, that is, to establish orthogonality.

Figure 5:
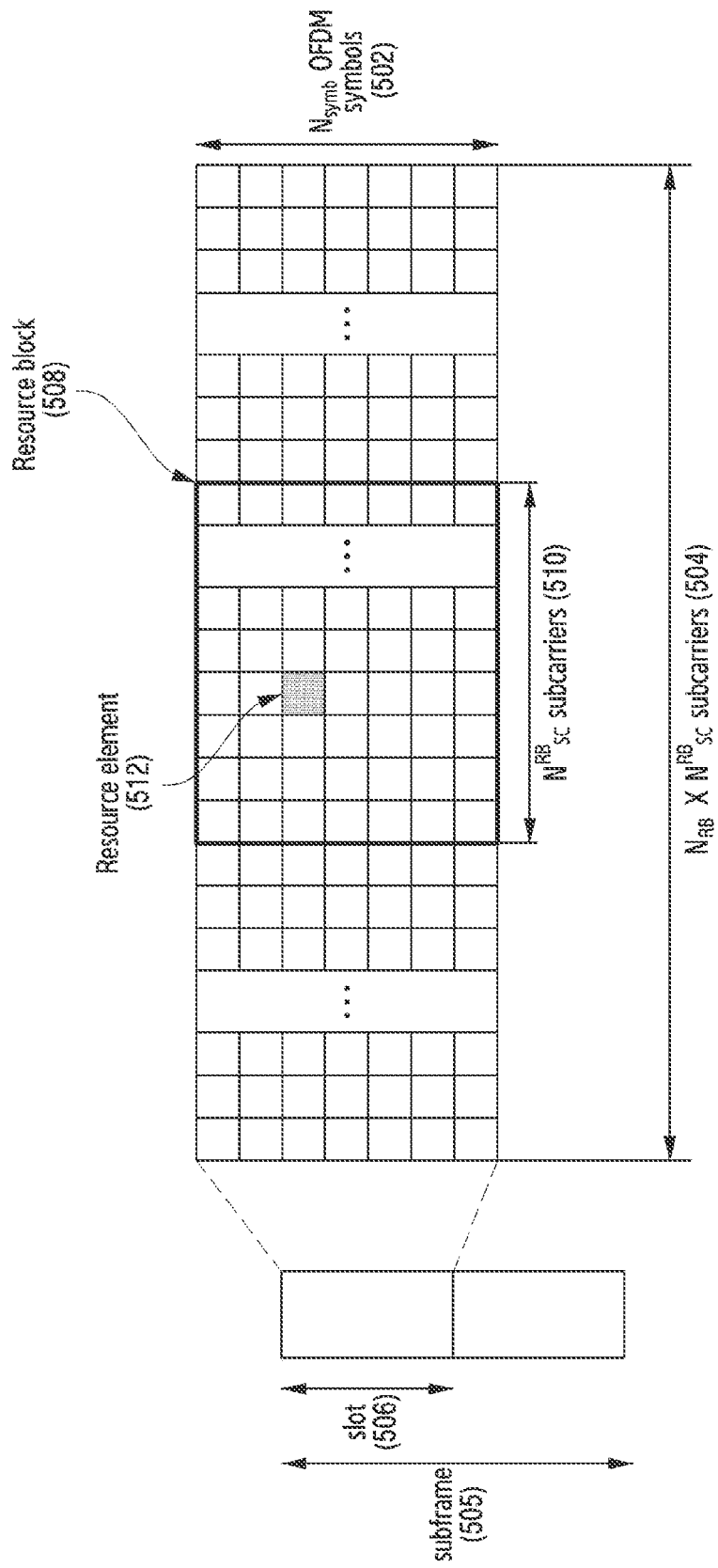
FIG. 5 illustrates a basic structure of a frequency-time domain which is a wireless resource region for transmitting data or control information in downlink in a long term evolution (LTE) system according to various embodiments of the present disclosure.

FIG. 5 illustrates a basic structure of a frequency-time domain which is a radio resource region for transmitting data or control information in downlink in an LTE system according to various embodiments of the present disclosure.

Referring to FIG. 5, a vertical axis indicates the time domain, and a horizontal axis indicates the frequency domain. A minimum transmission unit of the time domain is an OFDM symbol, Nsymb-ary OFDM symbols 502 construct one slot 506, and two slots construct one subframe 505. A length of the slot is 0.5 ms, and a length of the subframe is 1.0 ms. A minimum transmission unit of the frequency domain is a subcarrier.

A basic unit of resources in the time-frequency domain is a resource element (RE) 512, which may be indicated as an OFDM symbol index and a subcarrier index. A resource block (RB) 508 or a physical resource block (PRB) is defined as Nsymb-ary consecutive OFDM symbols 502 in the time domain and NRBSC-ary consecutive subcarriers 510 in the frequency domain. Hence, one RB 508 includes Nsymb x NRBSC-ary REs 512. In general, a minimum transmission unit of data is the RB, and the system transmission band includes NRB-ary RBs in total. In addition, the entire system transmission band includes NRB x NRBSC-ary subcarriers 504 in total. In the LTE system, Nsymb=7 and NRBSC=12 in general.

Control information is transmitted within first N-ary OFDM symbols of the subframe. A control channel transmission period N is N={1, 2, 3} in general. Thus, the value N varies for each subframe according to an amount of the control information to transmit in a current subframe. For example, the control information may include an indicator indicating how many OFDM symbols the control information is transmitted over, scheduling information of uplink or downlink data, hybrid automatic repeat request (HARQ) acknowledgement (ACK)/negative ACK (NACK) signal, and so on.

The wireless communication system adopts the HARQ scheme which retransmits corresponding data in a physical layer, if a decoding failure occurs in an initial transmission. If a receiver fails to correctly decode data, the HARQ scheme allows the receiver to transmit information (e.g., NACK) notifying the decoding failure to the transmitter so that the transmitter may retransmit corresponding data in the physical layer. The receiver increases data reception performance by combining the data retransmitted by the transmitter retransmits with the existing data which is failed in decoding. In addition, if the receiver correctly decodes the data, it may transmit information (e.g., ACK) indicating the decoding success so that transmitter may transmit new data.

One of the most important things in the wireless communication system to provide high-speed data service is to support a scalable bandwidth. In some embodiments, the system transmission band of the LTE system may have various bandwidth such as 20/15/10/5/3/1.4 MHz. Hence, service providers may provide services by selecting a specific bandwidth from the various bandwidths. In addition, a terminal (e.g., the terminal 120) may be of various types for supporting the bandwidth 20 MHz at maximum and supporting only the bandwidth 1.4 MHz at minimum.

In the wireless communication system, a base station (e.g., the base station 110) informs the terminal of scheduling information of downlink data or uplink data through downlink control information (DCI). The uplink means a radio link for a terminal to transmit data or a control signal to a base station, and the downlink means a radio link for a base station to transmit data or a control signal to a terminal. By defining various formats, the DCI is operated by applying a set DCI format according to uplink data scheduling information (UL grant) or downlink data scheduling information (DL grant), compact DCI with a small control information size, spatial multiplexing using multiple antennas, and DCI for power control. For example, DCI format 1 which is the downlink data scheduling information (DL grant) may be configured to include the following control information.

Resource allocation type 0/1 flag: Resource allocation type 0/1 flag notifies whether a resource allocation scheme is type 0 or type 1. Type 0 flag allocates resources on a resource block group (RBG) basis using a bitmap scheme. In the LTE system, a basic scheduling unit is an RB expressed as time and frequency domain resources, and the RBG includes a plurality of RBs to become the basic scheduling unit for the type 0. Type 1 flag allocates a specific RB in the RBG.

Resource block assignment: Resource block assignment notifies an RB assigned for data transmission. The expressed resource is determined according to the system bandwidth and the resource allocation scheme.

MCS: MCS notifies a modulation scheme used for the data transmission and a size of a transport block to be transmitted.

HARQ process number: HARQ process number notifies a process number of the HARQ.

New data indicator: New data indicator notifies either HARQ initial transmission or retransmission.

Redundancy version: Redundancy version notifies a redundancy version (RV) of the HARQ.

Transmit power control (TPC) command for physical uplink control channel (PUCCH): TPC command for a PUCCH notifies a power control command for PUCCH which is an uplink control channel.

The DCI is channel-coded, modulated, and transmitted through a physical downlink control channel (PDCCH) which is a DL physical control channel.

In general, the DCI is channel-coded independently per terminal, and then configured and transmitted as an independent PDCCH. The PDCCH in the time domain is mapped and transmitted in a control channel transmission interval. A mapping position of PDCCH in the frequency domain is determined by an identifier (ID) of each terminal, and dispersed across the entire system transmission bandwidth.

Downlink data is transmitted over a physical downlink shared channel (PDSCH) which is a physical channel for transmitting downlink data. The PDSCH is transmitted after the control channel transmission interval, and scheduling information such as a specific mapping position in the frequency domain or the modulation scheme is notified by the DCI transmitted over the PDCCH.

The base station notifies the terminal of the modulation scheme applied to the PDSCH to transmit and a data size (TBS) to transmit, through a 5-bit MCS in the control information of the DCI. The TBS corresponds to a size of the data to be transmitted by the base station before the channel coding for error correction is applied.

Typically, modulation schemes supported in the LTE include quadrature phase shift keying (QPSK), 16 quadrature amplitude modulation (QAM), 64QAM, 256QAM, and so on.

Figure 6:
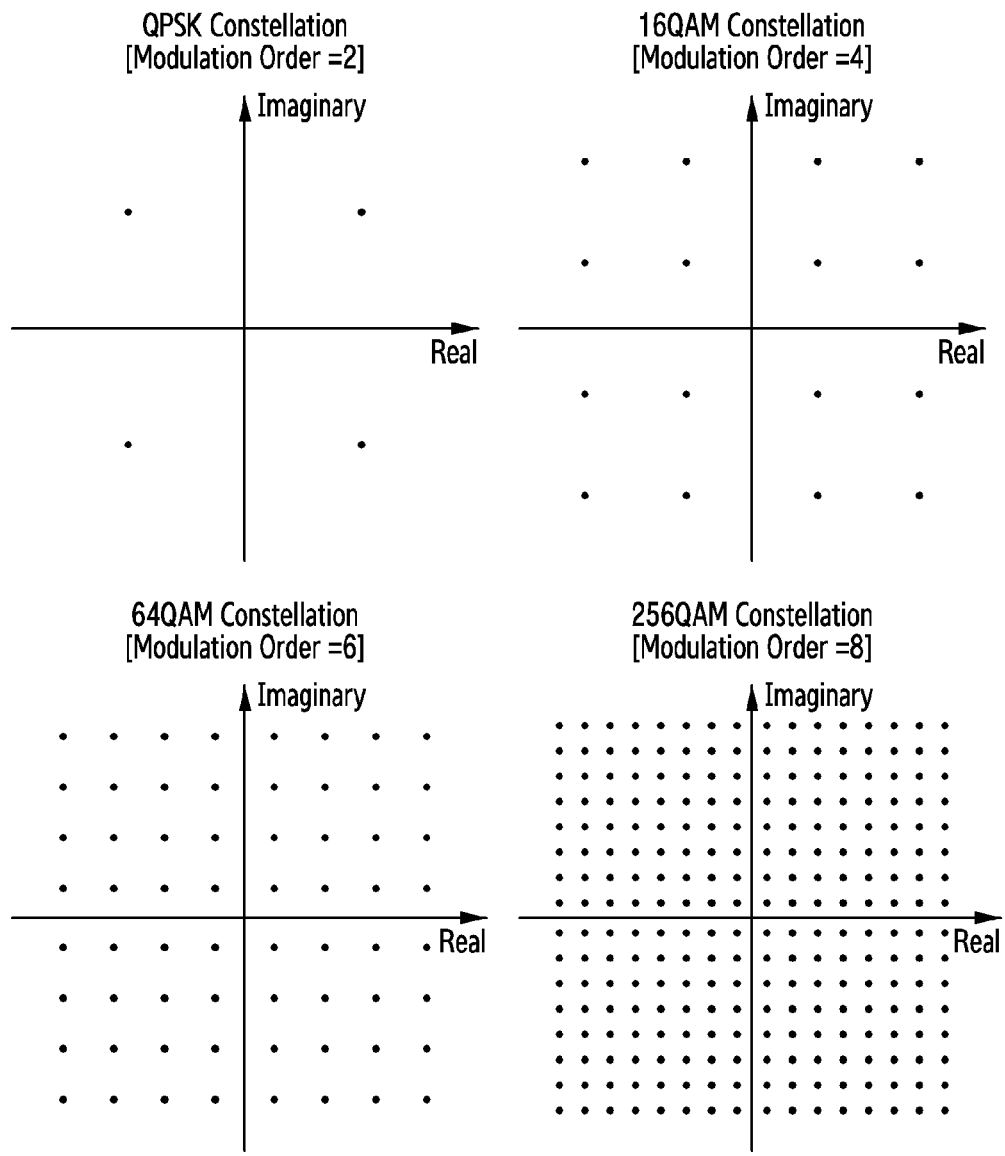
FIG. 6 illustrates a modulation scheme usable in a wireless communication system according to various embodiments of the present disclosure.

FIG. 6 illustrates a modulation scheme usable in a wireless communication system according to various embodiments of the present disclosure.

Referring to FIG. 6, the modulation scheme supported in the LTE system corresponds to QPSK, 16QAM, 64QAM, and 256QAM, and each corresponds to a modulation order (Qm)={2, 4, 6, 8}. That is, 2 bits may be transmitted per QPSK modulation symbol, 4 bits may be transmitted per 16QAM modulation symbol, 6 bits may be transmitted per 64QAM modulation symbol, and 8 bits may be transmitted per 256QAM modulation symbol. In the 256 QAM, the modulation order=8 and 8 bit may be transmitted for one modulation symbol, and accordingly transmission efficiency is higher than the 64 QAM over 33%. However, services supporting various reliabilities are not considered in the LTE system. The 5G system which is an advanced wireless communication system needs to define a method for generating and applying a CQI and MCS table suitable for the services supporting various reliabilities.

In a cellar system, a base station (e.g., the base station 110) needs to transmit a reference signal to measure a DL channel status. For example, in the LTE-A system of 3GPP, a terminal (e.g., the terminal 120) measures a channel status between the base station and the terminal using channel status information (CSI)-reference signal (RS) transmitted by the base station. The channel status needs to fundamentally consider some factors, wherein an interference amount in the DL is included. The interference amount in the DL includes an interference signal and a thermal noise caused by an antenna of a neighboring base station, and may be used for the terminal to determine a channel condition of the DL. For example, if a base station including one transmit antenna transmits an RS to a terminal including one receive antenna, the terminal determines an energy per symbol to interference density ratio (Es/Io) by determining an energy per symbol receivable in the DL from the RS received from the base station and an interference amount concurrently received in the reception interval of the corresponding symbol. The determined Es/Io is notified to the base station so that the base station may determine a data transfer rate for transmission to the terminal in the DL.

Figure 7:
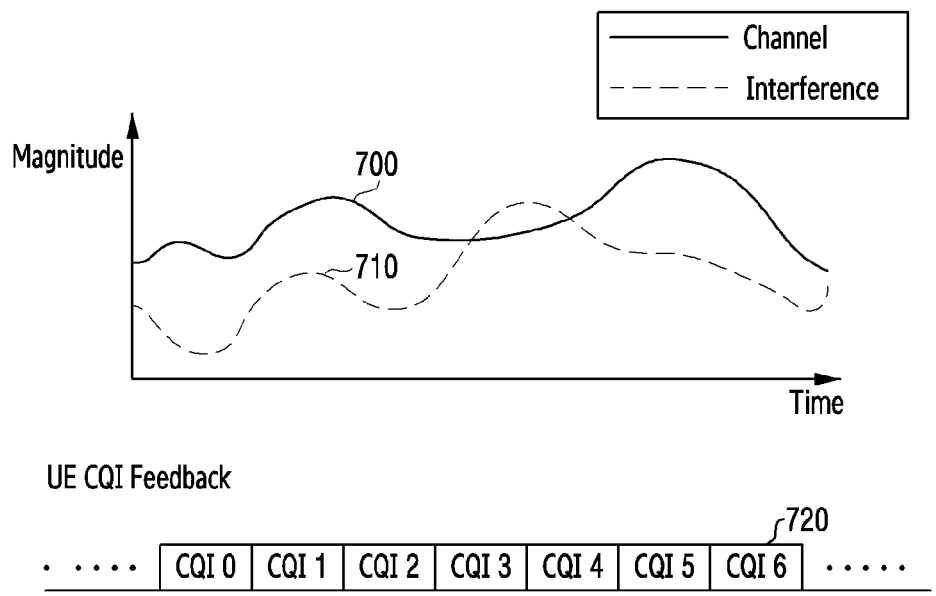
FIG. 7 illustrates an example of one channel quality indicator (CQI) transmission of channel state information of a terminal according to a signal energy and an interference level measured by the terminal according to various embodiments of the present disclosure.

FIG. 7 illustrates an example of one CQI transmission of channel status information of a terminal according to a signal energy and an interference level measured by the terminal according to various embodiments of the present disclosure.

Referring to FIG. 7, a terminal (e.g., the terminal 120) performs channel estimation by measuring a DL RS such as CSI-RS, and calculates the Es (the received signal energy) according to a radio channel using it as indicated by a solid line 700. In addition, the terminal calculates intensities of interference and noise of a dotted line 710 using a separate resource for measuring the DL RS or the interference and the noise. In the LTE, the base station assumes a signal measured in a corresponding radio resource as the interference and the noise by using the CRS being the DL RS or by setting an interference measurement resource to the terminal to measure the interference and the noise. The terminal determines and notifies to the base station a maximum data transfer rate receivable with a specific success rate in its calculated signal to interference and noise ratio using the received signal energy and the interference and noise intensities acquired as above. The base station notified with the maximum data transfer rate supportable by the terminal in the corresponding signal to interference and noise ratio determines an actual data transfer rate of the DL signal to transmit to the terminal using it. As such, the maximum data transfer rate receivable at the terminal with its specific success rate to the base station is referred to as CQI in the LTE standard. In general, since the radio channel varies based on time, the terminal notifies the CQI to the base station periodically or the base station notifies it to the terminal at a request. The request from the base station to the terminal may be performed using one or more of the periodic method and the aperiodic method.

The modulation scheme supported in the 5G system includes QPSK, 16QAM, 64QAM, and 256QAM. A different CQI table and a different MCS table may be used by a maximum modulation order supported by the terminal. A table where the maximum modulation order is 64QAM among CQI tables currently used in the LTE system, maintaining a uniform SNR gap between entries of the CQI table, efficiently enables the terminal to select a CQI for maximizing transmission efficiency and notify it to the base station. However, a table where the maximum modulation order is 256QAM has a wider SNR gap between entries corresponding to a low SNR among entries of the CQI table than an SNR gap of other entries. In this regard, various embodiments of the present disclosure suggest a method for generating a new CQI table instead of the CQI table in which the maximum-order modulation scheme used in the LTE is 256QAM. A method for generating and applying a CQI table according to various embodiments of the present disclosure is as follows.

CQI information amount is maintained at 4 bits as in the prior art to prevent a signaling overhead.

CQI index 0 is maintained as out of range.

CQI index 1 uses the same entry as the CQI index 1 of the table in which the maximum modulation order is 64QAM. Thus, the same coverage may be obtained between two different tables.

The modulation scheme of CQI index 15 is 256QAM, and its code rate is 972/1024. Herein, the code rate 972/1024 is the code rate of approximately 0.95.

Entries from CQI indexes 2 to 14 may be arranged to have a uniform SNR gap at maximum. For doing so, one available method is as follows. The terminal calculates bit-interleaved coding and modulation (BICM) capacity for the CQI index 1, and calculates BICM capacity for the CQI index 15. Next, the terminal divides a gap between the two values into 14 intervals. In so doing, assuming the same RE number, since CQI indexes of small indexes correspond to a relatively small information word, the gap between the CQI indexes of the small indexes may be set to be relatively wider than a gap of other CQI indexes. In some embodiments, the BICM capacity value set per CQI index is shown in Table 1 (the CQI table used if the maximum modulation order is 256QAM). Herein, the BICM capacity is a value rounded off to the nearest hundredths.

An optimal combination of the modulation scheme and the code rate per CQI index is found by referring to a BICM capacity curve. In some embodiments, combinations of the modulation scheme and the code rate are shown in Table 1.

TABLE 1

| CQI index | modulation | code rate × 1024 | BICM capacity [dB] |
|---|---|---|---|
| 0 | | out of range | |
| 1 | QPSK | 78 | −9.5 |
| 2 | QPSK | 140 | −6.8 |
| 3 | QPSK | 241 | −4.1 |
| 4 | QPSK | 389 | −1.5 |
| 5 | QPSK | 576 | 1 |
| 6 | 16QAM | 398 | 3.4 |
| 7 | 16QAM | 544 | 5.8 |
| 8 | 16QAM | 698 | 8.2 |
| 9 | 64QAM | 571 | 10.6 |
| 10 | 64QAM | 697 | 13 |
| 11 | 64QAM | 818 | 15.4 |
| 12 | 256QAM | 706 | 17.8 |
| 13 | 256QAM | 807 | 20.2 |
| 14 | 256QAM | 900 | 22.6 |
| 15 | 256QAM | 972 | 24.9 |

In some embodiments, the terminal performs one or more of the following operations if using entry values corresponding to two successive indexes of the entries of the CQI table of Table 1.

The terminal reports the CQI index #1 to the base station if the BLER with the code rate of 78/1024 and the modulation order of QPSK is lower than a target.

The terminal reports the CQI index #2 to the base station if the BLER with the code rate of 78/1024 and the modulation order of QPSK is higher than the target and the BLER with the code rate of 140/1024 and the modulation order of QPSK is lower than the target.

The terminal reports the CQI index #3 to the base station if the BLER with the code rate of 140/1024 and the modulation order of QPSK is higher than the target and the BLER with the code rate of 241/1024 and the modulation order of QPSK is lower than the target.

The terminal reports the CQI index #4 to the base station if the BLER with the code rate of 241/1024 and the modulation order of QPSK is higher than the target and the BLER with the code rate of 389/1024 and the modulation order of QPSK is lower than the target.

The terminal reports the CQI index #5 to the base station if the BLER with the code rate of 389/1024 and the modulation order of QPSK is higher than the target and the BLER with the code rate of 576/1024 and the modulation order of QPSK is lower than the target.

The terminal reports the CQI index #6 to the base station if the BLER with the code rate of 576/1024 and the modulation order of QPSK is higher than the target and the BLER with the code rate of 398/1024 and the modulation order of 16QAM is lower than the target.

The terminal reports the CQI index #7 to the base station if the BLER with the code rate of 398/1024 and the modulation order of 16QAM is higher than the target and the BLER with the code rate of 544/1024 and the modulation order of 16QAM is lower than the target.

The terminal reports the CQI index #8 to the base station if the BLER with the code rate of 544/1024 and the modulation order of 16QAM is higher than the target and the BLER with the code rate of 698/1024 and the modulation order of 16QAM is lower than the target.

The terminal reports the CQI index #9 to the base station if the BLER with the code rate of 698/1024 and the modulation order of 16QAM is higher than the target and the BLER with the code rate of 571/1024 and the modulation order of 64QAM is lower than the target.

The terminal reports the CQI index #10 to the base station if the BLER with the code rate of 571/1024 and the modulation order of 64QAM is higher than the target and the BLER with the code rate of 697/1024 and the modulation order of 64QAM is lower than the target.

The terminal reports the CQI index #11 to the base station if the BLER with the code rate of 697/1024 and the modulation order of 64QAM is higher than the target and the BLER with the code rate of 818/1024 and the modulation order of 64QAM is lower than the target.

The terminal reports the CQI index #12 to the base station if the BLER with the code rate of 818/1024 and the modulation order of 64QAM is higher than the target and the BLER with the code rate of 706/1024 and the modulation order of 256QAM is lower than the target.

The terminal reports the CQI index #13 to the base station if the BLER with the code rate of 706/1024 and the modulation order of 256QAM is higher than the target and the BLER with the code rate of 807/1024 and the modulation order of 256QAM is lower than the target.

The terminal reports the CQI index #14 to the base station if the BLER with the code rate of 807/1024 and the modulation order of 256QAM is higher than the target and the BLER with the code rate of 900/1024 and the modulation order of 256QAM is lower than the target.

The terminal reports the CQI index #15 to the base station if the BLER with the code rate of 900/1024 and the modulation order of 256QAM is higher than the target and the BLER with the code rate of 972/1024 and the modulation order of 256QAM is lower than the target.

A method for generating and applying a CQI table according to other embodiments of the present disclosure is as follows.

The CQI information amount is maintained at 4 bits as in the prior art to prevent the signaling overhead.

The CQI index 0 is maintained as out of range.

The CQI index 1 uses the same entry as the CQI index 1 of the table in which the maximum modulation order is 64QAM. Thus, the same coverage may be obtained between two different tables.

The modulation scheme of the CQI index 15 is 256QAM, and its code rate is 960/1024. Herein, the code rate 960/1024 is the code rate of approximately 0.9375.

Entries from the CQI indexes 2 to 14 may be arranged to have the uniform SNR gap at maximum. For doing so, one available method is as follows. The terminal calculates the BICM capacity for the CQI index 1, and calculates BICM capacity for the CQI index 15. Next, the terminal divides a gap between the two values into 14 intervals. In so doing, assuming the same RE number, since CQI indexes of small indexes correspond to a relatively small information word, the gap between the CQI indexes of the small indexes may be set to be relatively wider than the gap of other CQI indexes. In some embodiments, the BICM capacity value set per CQI index is shown in Table 2 (the CQI table used if the maximum modulation order is 256QAM). Herein, the BICM capacity is a value rounded off to the nearest hundredths.

An optimal combination of the modulation scheme and the code rate per CQI index is found by referring to the BICM capacity curve. In some embodiments, combinations of the modulation scheme and the code rate are shown in Table 2

TABLE 2

| CQI index | modulation | code rate × 1024 | BICM capacity [dB] |
| --- | --- | --- | --- |
| 0 | | out of range | |
| 1 | QPSK | 78 | −9.5 |
| 2 | QPSK | 134 | −7.0 |
| 3 | QPSK | 223 | −4.5 |
| 4 | QPSK | 357 | −2.0 |
| 5 | QPSK | 528 | 0.4 |
| 6 | 16QAM | 364 | 2.8 |
| 7 | 16QAM | 506 | 5.2 |
| 8 | 16QAM | 660 | 7.6 |
| 9 | 64QAM | 540 | 10.0 |
| 10 | 64QAM | 665 | 12.4 |
| 11 | 64QAM | 788 | 14.8 |
| 12 | 256QAM | 680 | 17.2 |
| 13 | 256QAM | 782 | 19.6 |
| 14 | 256QAM | 878 | 22.0 |
| 15 | 256QAM | 960 | 24.4 |

In some embodiments, the terminal performs one or more of the following operations if using entry values corresponding to two consecutive indexes of the entries of the CQI table of Table 2.

The terminal reports the CQI index #1 to the base station if the BLER with the code rate of 78/1024 and the modulation order of QPSK is lower than the target.

The terminal reports the CQI index #2 to the base station if the BLER with the code rate of 78/1024 and the modulation order of QPSK is higher than the target and the BLER with the code rate of 134/1024 and the modulation order of QPSK is lower than the target.

The terminal reports the CQI index #3 to the base station if the BLER with the code rate of 134/1024 and the modulation order of QPSK is higher than the target and the BLER with the code rate of 223/1024 and the modulation order of QPSK is lower than the target.

The terminal reports the CQI index #4 to the base station if the BLER with the code rate of 223/1024 and the modulation order of QPSK is higher than the target and the BLER with the code rate of 357/1024 and the modulation order of QPSK is lower than the target.

The terminal reports the CQI index #5 to the base station if the BLER with the code rate of 357/1024 and the modulation order of QPSK is higher than the target and the BLER with the code rate of 528/1024 and the modulation order of QPSK is lower than the target.

The terminal reports the CQI index #6 to the base station if the BLER with the code rate of 528/1024 and the modulation order of QPSK is higher than the target and the BLER with the code rate of 364/1024 and the modulation order of 16QAM is lower than the target.

The terminal reports the CQI index #7 to the base station if the BLER with the code rate of 364/1024 and the modulation order of 16QAM is higher than the target and the BLER with the code rate of 506/1024 and the modulation order of 16QAM is lower than the target.

The terminal reports the CQI index #8 to the base station if the BLER with the code rate of 506/1024 and the modulation order of 16QAM is higher than the target and the BLER with the code rate of 660/1024 and the modulation order of 16QAM is lower than the target.

The terminal reports the CQI index #9 to the base station if the BLER with the code rate of 660/1024 and the modulation order of 16QAM is higher than the target and the BLER with the code rate of 540/1024 and the modulation order of 64QAM is lower than the target.

The terminal reports the CQI index #10 to the base station if the BLER with the code rate of 540/1024 and the modulation order of 64QAM is higher than the target and the BLER with the code rate of 665/1024 and the modulation order of 64QAM is lower than the target.

The terminal reports the CQI index #11 to the base station if the BLER with the code rate of 665/1024 and the modulation order of 64QAM is higher than the target and the BLER with the code rate of 788/1024 and the modulation order of 64QAM is lower than the target.

The terminal reports the CQI index #12 to the base station if the BLER with the code rate of 788/1024 and the modulation order of 64QAM is higher than the target and the BLER with the code rate of 680/1024 and the modulation order of 256QAM is lower than the target.

The terminal reports the CQI index #13 to the base station if the BLER with the code rate of 680/1024 and the modulation order of 256QAM is higher than the target and the BLER with the code rate of 782/1024 and the modulation order of 256QAM is lower than the target.

The terminal reports the CQI index #14 to the base station if the BLER with the code rate of 782/1024 and the modulation order of 256QAM is higher than the target and the BLER with the code rate of 878/1024 and the modulation order of 256QAM is lower than the target.

The terminal reports the CQI index #15 to the base station if the BLER with the code rate of 878/1024 and the modulation order of 256QAM is higher than the target and the BLER with the code rate of 960/1024 and the modulation order of 256QAM is lower than the target.

Herein, the BLER value may mean an error occurrence probability after decoding of the received transport block is completed. In some embodiments, the terminal may decode a number of transport blocks and then determine the BLER value through an adequate calculation, but the BLER value may be generally determined through the received SNR. Hence, the terminal may predict whether the decoding is successful by measuring only the received SNR without performing the actual decoding and report the CQI index to the base station.

Meanwhile, a different reliability may be required according to the service type supported in the 5G system, and a different CQI table may be used according to the required reliability. In some embodiments, an eMBB scenario operates to target for BLER 0.1 in the 5G, but a URLLC scenario may operate to target for BLER $10^{-5}$. In addition, among the eMBB or URLLC scenario, there may be a scenario operating to target for two or more different BLERs or received SNRs. For example, a URLLC scenario #1 may operate to target for BLER $10^{-3}$ and a URLLC scenario #2 may operate to target for BLER $10^{-5}$.

The terminal may notify the base station of CSI including an intended scenario to be serviced or the required reliability or its corresponding or related information. In addition, the base station may notify a scenario currently applied to the terminal through RRC configuration. The used CQI table or the entry values per CQI index may be changed by the set scenario or the required reliability or its corresponding or related information.

Hence, an embodiment of the present disclosure provides a method for generating and applying a CQI table to apply a different scenario. If there are two more scenarios having different target BLERs (or the received SNR or its corresponding or related information) to support with the same maximum modulation order, two or more different CQI tables corresponding to their target BLER (or the received SNR or its corresponding or related information) may be used. In so doing, a plurality of entries of all of entries of one or more CQI tables of the total CQI table may have a specified relation with entries having the same CQI index among entries of other CQI table. For example, a plurality of entries selected may have the same modulation order in two or more CQI tables. In another example, a plurality of entries selected may have the code rate which differs by a preset value in two or more CQI tables. Herein, the code rate is not an effective code rate, but may be a representative value of the code rate or a nominal code rate. The nominal code rate may be expressed with a decimal between 0 and 1 as expressed in the code rate, but may be expressed with a numerator value if a denominator is a square of 2 such as 1024. For example, if the code rate is 0.5 and the denominator is 1024, it may be expressed as 512. This code rate is a code rate designated in the signaling, and may not precisely match this code rate in actual decoding because of additional overhead. Hereafter, to facilitate descriptions, the target BLER or the received SNR or its corresponding or related information may be referred to as the target BLER.

That is, the terminal may determine the modulation scheme and the code rate using a specific CQI table, and then adjust and use the code rate by a preset value according to the scenario defined in its intended target BLER or RRC configuration.

An example of the CQI table found in some embodiments is shown in Table 3 through Table 7 (the CQI tables used if the maximum modulation order is 256QAM). The CQI tables in Table 3 through Table 7 are CQI tables having the same maximum modulation order which is 256QAM but usable in a scenario having different BLER targets. The terminal may determine of which table entry values are used through the RRC configuration. The different CQI tables shown in Table 3 through Table 7 have the same modulation order between entries having the same CQI index, and 1024 times the code rate differs by 12, 24, 36, or 48.

TABLE 3

| CQI index | modulation | code rate × 1024 | efficiency |
|---|---|---|---|
| 0 | | out of range | |
| 1 | QPSK | 78 | 0.1523 |
| 2 | QPSK | 140 | 0.2734 |
| 3 | QPSK | 241 | 0.4707 |
| 4 | QPSK | 389 | 0.7598 |
| 5 | QPSK | 576 | 1.1250 |
| 6 | 16QAM | 398 | 1.5547 |
| 7 | 16QAM | 544 | 2.125 |
| 8 | 16QAM | 698 | 2.7266 |
| 9 | 64QAM | 571 | 3.3457 |
| 10 | 64QAM | 697 | 4.0840 |
| 11 | 64QAM | 818 | 4.7930 |
| 12 | 256QAM | 706 | 5.5156 |
| 13 | 256QAM | 807 | 6.3047 |
| 14 | 256QAM | 900 | 7.0313 |
| 15 | 256QAM | 972 | 7.5938 |

TABLE 4

| CQI index | modulation | code rate × 1024 | efficiency |
|---|---|---|---|
| 0 | | out of range | |
| 1 | QPSK | 66 | 0.1289 |
| 2 | QPSK | 128 | 0.2500 |
| 3 | QPSK | 229 | 0.4473 |
| 4 | QPSK | 377 | 0.7363 |
| 5 | QPSK | 564 | 1.1016 |
| 6 | 16QAM | 386 | 1.5078 |
| 7 | 16QAM | 532 | 2.0781 |
| 8 | 16QAM | 686 | 2.6797 |
| 9 | 64QAM | 559 | 3.2754 |
| 10 | 64QAM | 685 | 4.0137 |
| 11 | 64QAM | 806 | 4.7227 |
| 12 | 256QAM | 694 | 5.4219 |
| 13 | 256QAM | 795 | 6.2109 |
| 14 | 256QAM | 888 | 6.9375 |
| 15 | 256QAM | 960 | 7.5000 |

TABLE 5

| CQI index | modulation | code rate × 1024 | efficiency |
|---|---|---|---|
| 0 | | out of range | |
| 1 | QPSK | 54 | 0.1055 |
| 2 | QPSK | 116 | 0.2266 |
| 3 | QPSK | 217 | 0.4238 |
| 4 | QPSK | 365 | 0.7129 |
| 5 | QPSK | 552 | 1.0781 |
| 6 | 16QAM | 374 | 1.4609 |
| 7 | 16QAM | 520 | 2.0313 |
| 8 | 16QAM | 674 | 2.6328 |
| 9 | 64QAM | 547 | 3.2051 |
| 10 | 64QAM | 673 | 3.9434 |
| 11 | 64QAM | 794 | 4.6523 |
| 12 | 256QAM | 682 | 5.3281 |
| 13 | 256QAM | 783 | 6.1172 |
| 14 | 256QAM | 876 | 6.8438 |
| 15 | 256QAM | 948 | 7.4063 |

TABLE 6

| CQI index | modulation | code rate × 1024 | efficiency |
|---|---|---|---|
| 0 | | out of range | |
| 1 | QPSK | 42 | 0.0820 |
| 2 | QPSK | 104 | 0.2031 |
| 3 | QPSK | 205 | 0.4004 |
| 4 | QPSK | 353 | 0.6895 |
| 5 | QPSK | 540 | 1.0547 |
| 6 | 16QAM | 362 | 1.4141 |
| 7 | 16QAM | 508 | 1.9844 |
| 8 | 16QAM | 662 | 2.5859 |
| 9 | 64QAM | 535 | 3.1348 |
| 10 | 64QAM | 661 | 3.8730 |
| 11 | 64QAM | 782 | 4.5820 |
| 12 | 256QAM | 670 | 5.2344 |
| 13 | 256QAM | 771 | 6.0234 |
| 14 | 256QAM | 864 | 6.7500 |
| 15 | 256QAM | 936 | 7.3125 |

TABLE 7

| CQI index | modulation | code rate × 1024 | efficiency |
|---|---|---|---|
| 0 | | out of range | |
| 1 | QPSK | 30 | 0.0586 |
| 2 | QPSK | 92 | 0.1797 |
| 3 | QPSK | 193 | 0.3770 |
| 4 | QPSK | 341 | 0.6660 |
| 5 | QPSK | 528 | 1.0313 |
| 6 | 16QAM | 350 | 1.3672 |
| 7 | 16QAM | 496 | 1.9375 |
| 8 | 16QAM | 650 | 2.5391 |
| 9 | 64QAM | 523 | 3.0645 |
| 10 | 64QAM | 649 | 3.8027 |
| 11 | 64QAM | 770 | 4.5117 |
| 12 | 256QAM | 658 | 5.1406 |
| 13 | 256QAM | 759 | 5.9297 |
| 14 | 256QAM | 852 | 6.6563 |
| 15 | 256QAM | 924 | 7.2188 |

In the above embodiments, the entries of the CQI table having a specific relation with an entry of other CQI table are not represented separately, and may be represented with a relation with the entry of the other CQI table which is a reference. For example, in the above embodiment, a plurality of entries selected from two different tables be expressed with the identical modulation order, and the code rate which differs by 12, 24, 36, or 48.

In some embodiments, the CQI table found may be shown in Table 8 through Table 12 (the CQI tables used if the maximum modulation order is 256QAM). The CQI tables in Table 8 through Table 12 are CQI tables having the same maximum modulation order which is 256QAM but usable in a scenario having different target BLERs. The terminal may determine of which table entry values are used through the RRC configuration. The different CQI tables shown in Table 8 through Table 12 have the same modulation order between entries having the same CQI index, and 1024 times the code rate differs by 12, 24, 36, or 48.

TABLE 8

| CQI index | modulation | code rate × 1024 | efficiency |
|---|---|---|---|
| 0 | | out of range | |
| 1 | QPSK | 78 | 0.1523 |
| 2 | QPSK | 134 | 0.2617 |
| 3 | QPSK | 223 | 0.4355 |
| 4 | QPSK | 357 | 0.6973 |
| 5 | QPSK | 528 | 1.0313 |
| 6 | 16QAM | 364 | 1.4219 |
| 7 | 16QAM | 506 | 1.9766 |
| 8 | 16QAM | 660 | 2.5781 |
| 9 | 64QAM | 540 | 3.1641 |
| 10 | 64QAM | 665 | 3.8965 |
| 11 | 64QAM | 788 | 4.6172 |
| 12 | 256QAM | 680 | 5.3125 |
| 13 | 256QAM | 782 | 6.1094 |

TABLE 8-continued

| CQI index | modulation | code rate × 1024 | efficiency |
|---|---|---|---|
| 14 | 256QAM | 878 | 6.8594 |
| 15 | 256QAM | 960 | 7.5000 |

TABLE 9

| CQI index | modulation | code rate × 1024 | efficiency |
|---|---|---|---|
| 0 | out of range | | |
| 1 | QPSK | 66 | 0.1289 |
| 2 | QPSK | 122 | 0.2383 |
| 3 | QPSK | 211 | 0.4121 |
| 4 | QPSK | 345 | 0.6738 |
| 5 | QPSK | 516 | 1.0078 |
| 6 | 16QAM | 352 | 1.375 |
| 7 | 16QAM | 494 | 1.9297 |
| 8 | 16QAM | 648 | 2.5313 |
| 9 | 64QAM | 528 | 3.0938 |
| 10 | 64QAM | 653 | 3.8262 |
| 11 | 64QAM | 776 | 4.5469 |
| 12 | 256QAM | 668 | 5.2188 |
| 13 | 256QAM | 770 | 6.0156 |
| 14 | 256QAM | 866 | 6.7656 |
| 15 | 256QAM | 948 | 7.4063 |

TABLE 10

| CQI index | modulation | code rate × 1024 | efficiency |
|---|---|---|---|
| 0 | out of range | | |
| 1 | QPSK | 54 | 0.1055 |
| 2 | QPSK | 110 | 0.2148 |
| 3 | QPSK | 199 | 0.3887 |
| 4 | QPSK | 333 | 0.6504 |
| 5 | QPSK | 504 | 0.9844 |
| 6 | 16QAM | 340 | 1.3281 |
| 7 | 16QAM | 482 | 1.8828 |
| 8 | 16QAM | 636 | 2.4844 |
| 9 | 64QAM | 516 | 3.0234 |
| 10 | 64QAM | 641 | 3.7559 |
| 11 | 64QAM | 764 | 4.4766 |
| 12 | 256QAM | 656 | 5.125 |
| 13 | 256QAM | 758 | 5.9219 |
| 14 | 256QAM | 854 | 6.6719 |
| 15 | 256QAM | 936 | 7.3125 |

TABLE 11

| CQI index | modulation | code rate × 1024 | efficiency |
|---|---|---|---|
| 0 | out of range | | |
| 1 | QPSK | 42 | 0.0820 |
| 2 | QPSK | 104 | 0.2031 |
| 3 | QPSK | 205 | 0.4004 |
| 4 | QPSK | 353 | 0.6895 |
| 5 | QPSK | 540 | 1.0547 |
| 6 | 16QAM | 362 | 1.4141 |
| 7 | 16QAM | 508 | 1.9844 |
| 8 | 16QAM | 662 | 2.5859 |
| 9 | 64QAM | 535 | 3.1348 |
| 10 | 64QAM | 661 | 3.8730 |
| 11 | 64QAM | 782 | 4.5820 |
| 12 | 256QAM | 670 | 5.2344 |
| 13 | 256QAM | 771 | 6.0234 |
| 14 | 256QAM | 864 | 6.7500 |
| 15 | 256QAM | 936 | 7.3125 |

TABLE 12

| CQI index | modulation | code rate × 1024 | efficiency |
|---|---|---|---|
| 0 | out of range | | |
| 1 | QPSK | 42 | 0.082 |
| 2 | QPSK | 98 | 0.1914 |
| 3 | QPSK | 187 | 0.3652 |
| 4 | QPSK | 321 | 0.627 |
| 5 | QPSK | 492 | 0.9609 |
| 6 | 16QAM | 328 | 1.2813 |
| 7 | 16QAM | 470 | 1.8359 |
| 8 | 16QAM | 624 | 2.4375 |
| 9 | 64QAM | 504 | 2.9531 |
| 10 | 64QAM | 629 | 3.6855 |
| 11 | 64QAM | 752 | 4.4063 |
| 12 | 256QAM | 644 | 5.0313 |
| 13 | 256QAM | 746 | 5.8281 |
| 14 | 256QAM | 842 | 6.5781 |
| 15 | 256QAM | 924 | 7.2188 |

In the above embodiments, the entries of the CQI table having a specific relation with an entry of other CQI table are not represented separately, and may be represented with a relation with the entry of the other CQI table which is a reference. In some embodiments, a plurality of entries selected from two different tables may be expressed with the identical modulation order, and the code rate which differs by 12, 24, 36, or 48.

In some embodiments, the CQI table may be defined as shown in Table 13 through Table 17 (the CQI tables used if the maximum modulation order is 64QAM). The CQI tables in Table 13 through Table 17 are CQI tables having the same maximum modulation order which is 64QAM but usable in a scenario having different BLER targets. The terminal may determine of which table entry values are used through the RRC configuration. The terminal may determine of which table entry values are used through a CSI report of the terminal. The different CQI tables shown in Table 13 through Table 17 have a relation that the same modulation order between entries having the same CQI index, and the code rate differs by 12, 24, 36, or 48.

TABLE 13

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 14

| CQI index | modulation | code rate × 1024 | efficiency |
|---|---|---|---|
| 0 | out of range | | |
| 1 | QPSK | 66 | 0.1289 |
| 2 | QPSK | 108 | 0.2109 |
| 3 | QPSK | 181 | 0.3535 |
| 4 | QPSK | 296 | 0.5781 |

TABLE 14-continued

| CQI index | modulation | code rate x 1024 | efficiency |
|---|---|---|---|
| 5 | QPSK | 437 | 0.8535 |
| 6 | QPSK | 590 | 1.1523 |
| 7 | 16QAM | 366 | 1.4297 |
| 8 | 16QAM | 478 | 1.8672 |
| 9 | 16QAM | 604 | 2.3594 |
| 10 | 64QAM | 454 | 2.6602 |
| 11 | 64QAM | 555 | 3.252 |
| 12 | 64QAM | 654 | 3.832 |
| 13 | 64QAM | 760 | 4.4531 |
| 14 | 64QAM | 861 | 5.0449 |
| 15 | 64QAM | 936 | 5.4844 |

TABLE 15

| CQI index | modulation | code rate x 1024 | efficiency |
|---|---|---|---|
| 0 | | out of range | |
| 1 | QPSK | 54 | 0.1055 |
| 2 | QPSK | 96 | 0.1875 |
| 3 | QPSK | 169 | 0.3301 |
| 4 | QPSK | 284 | 0.5547 |
| 5 | QPSK | 425 | 0.8301 |
| 6 | QPSK | 578 | 1.1289 |
| 7 | 16QAM | 354 | 1.3828 |
| 8 | 16QAM | 466 | 1.8203 |
| 9 | 16QAM | 592 | 2.3125 |
| 10 | 64QAM | 442 | 2.5898 |
| 11 | 64QAM | 543 | 3.1816 |
| 12 | 64QAM | 642 | 3.7617 |
| 13 | 64QAM | 748 | 4.3828 |
| 14 | 64QAM | 849 | 4.9746 |
| 15 | 64QAM | 924 | 5.4141 |

TABLE 16

| CQI index | modulation | code rate x 1024 | efficiency |
|---|---|---|---|
| 0 | | out of range | |
| 1 | QPSK | 42 | 0.082 |
| 2 | QPSK | 84 | 0.1641 |
| 3 | QPSK | 157 | 0.3066 |
| 4 | QPSK | 272 | 0.5313 |
| 5 | QPSK | 413 | 0.8066 |
| 6 | QPSK | 566 | 1.1055 |
| 7 | 16QAM | 342 | 1.3359 |
| 8 | 16QAM | 454 | 1.7734 |
| 9 | 16QAM | 580 | 2.2656 |
| 10 | 64QAM | 430 | 2.5195 |
| 11 | 64QAM | 531 | 3.1113 |
| 12 | 64QAM | 630 | 3.6914 |
| 13 | 64QAM | 736 | 4.3125 |
| 14 | 64QAM | 837 | 4.9043 |
| 15 | 64QAM | 912 | 5.3438 |

TABLE 17

| CQI index | modulation | code rate x 1024 | efficiency |
|---|---|---|---|
| 0 | | out of range | |
| 1 | QPSK | 30 | 0.0586 |
| 2 | QPSK | 72 | 0.1406 |
| 3 | QPSK | 145 | 0.2832 |
| 4 | QPSK | 260 | 0.5078 |
| 5 | QPSK | 401 | 0.7832 |
| 6 | QPSK | 554 | 1.082 |
| 7 | 16QAM | 330 | 1.2891 |
| 8 | 16QAM | 442 | 1.7266 |
| 9 | 16QAM | 568 | 2.2188 |
| 10 | 64QAM | 418 | 2.4492 |
| 11 | 64QAM | 519 | 3.041 |
| 12 | 64QAM | 618 | 3.6211 |

TABLE 17-continued

| CQI index | modulation | code rate x 1024 | efficiency |
|---|---|---|---|
| 13 | 64QAM | 724 | 4.2422 |
| 14 | 64QAM | 825 | 4.834 |
| 15 | 64QAM | 900 | 5.2734 |

In the above embodiments, entries of a CQI table having a specific relation with an entry of other CQI table are not represented separately, and may be represented with a relation with the entry of the other CQI table which is a reference. In the above embodiments, the modulation order is identical, and the code rate differs by 12, 24, 36, or 48.

As another embodiment of the method for generating the CQI table to apply different scenarios, a plurality of entries of the entire entries of one or more CQI tables among the whole CQI tables may use a plurality of entries of entries of other CQI table by changing only the CQI index. Alternatively, the modulation order may be maintained and only the code rate may be changed by a set value. Other entries may be set to have the modulation order and the code rate having a specific frequency efficiency between spectral efficiencies of two adjacent different entries. As an example for defining the modulation order and the code rate having the specific frequency efficiency, there may be a method for determining the modulation order and the code rate having a required intermediate SNR by referring to the BICM capacity.

The CQI table generated in such a manner may be defined as shown in Table 18 through Table 22 (the CQIs table used if the maximum modulation order is 16QAM). The CQI tables shown in Table 18 through Table 22 is CQI tables usable in a scenario having the identical maximum modulation order of 16QAM but different BLER targets. The terminal may determine of which table entry values are applied through the RRC configuration. The different CQI tables shown in Table 18 through Table 22 have the same modulation order between entries having the same CQI index, and the code rate differs by a multiple of 12. In addition, the CQI tables shown in Table 18 through Table 22 use eight CQI index entries in the CQI tables as shown in Table 3 through Table 7, or change only the code rate by 12, 24, 36, or 48.

TABLE 18

| CQI index | modulation | code rate x 1024 | efficiency |
|---|---|---|---|
| 0 | | out of range | |
| 1 | QPSK | 78 | 0.1523 |
| 2 | QPSK | 105 | 0.2051 |
| 3 | QPSK | 140 | 0.2734 |
| 4 | QPSK | 184 | 0.3594 |
| 5 | QPSK | 241 | 0.4707 |
| 6 | QPSK | 309 | 0.6035 |
| 7 | QPSK | 389 | 0.7598 |
| 8 | QPSK | 482 | 0.9414 |
| 9 | QPSK | 576 | 1.1250 |
| 10 | QPSK | 673 | 1.3145 |
| 11 | 16QAM | 398 | 1.5547 |
| 12 | 16QAM | 469 | 1.8320 |
| 13 | 16QAM | 544 | 2.1250 |
| 14 | 16QAM | 621 | 2.4258 |
| 15 | 16QAM | 698 | 2.7266 |

TABLE 19

| CQI index | modulation | code rate x 1024 | efficiency |
|---|---|---|---|
| 0 | | out of range | |
| 1 | QPSK | 66 | 0.1289 |

TABLE 19-continued

| CQI index | modulation | code rate x 1024 | efficiency |
|---|---|---|---|
| 2 | QPSK | 93 | 0.1816 |
| 3 | QPSK | 128 | 0.2500 |
| 4 | QPSK | 172 | 0.3359 |
| 5 | QPSK | 229 | 0.4473 |
| 6 | QPSK | 297 | 0.5801 |
| 7 | QPSK | 377 | 0.7363 |
| 8 | QPSK | 470 | 0.9180 |
| 9 | QPSK | 564 | 1.1016 |
| 10 | QPSK | 320 | 1.2500 |
| 11 | 16QAM | 386 | 1.5078 |
| 12 | 16QAM | 457 | 1.7852 |
| 13 | 16QAM | 532 | 2.0781 |
| 14 | 16QAM | 609 | 2.3789 |
| 15 | 16QAM | 686 | 2.6797 |

TABLE 20

| CQI index | modulation | code rate x 1024 | efficiency |
|---|---|---|---|
| 0 | | out of range | |
| 1 | QPSK | 54 | 0.1055 |
| 2 | QPSK | 81 | 0.1582 |
| 3 | QPSK | 116 | 0.2266 |
| 4 | QPSK | 160 | 0.3125 |
| 5 | QPSK | 217 | 0.4238 |
| 6 | QPSK | 285 | 0.5566 |
| 7 | QPSK | 365 | 0.7129 |
| 8 | QPSK | 458 | 0.8945 |
| 9 | QPSK | 552 | 1.0781 |
| 10 | QPSK | 308 | 1.2031 |
| 11 | 16QAM | 374 | 1.4609 |
| 12 | 16QAM | 445 | 1.7383 |
| 13 | 16QAM | 520 | 2.0313 |
| 14 | 16QAM | 597 | 2.3320 |
| 15 | 16QAM | 674 | 2.6328 |

TABLE 21

| CQI index | modulation | code rate x 1024 | efficiency |
|---|---|---|---|
| 0 | | out of range | |
| 1 | QPSK | 42 | 0.0820 |
| 2 | QPSK | 69 | 0.1348 |
| 3 | QPSK | 104 | 0.2031 |
| 4 | QPSK | 148 | 0.2891 |
| 5 | QPSK | 205 | 0.4004 |
| 6 | QPSK | 273 | 0.5332 |
| 7 | QPSK | 353 | 0.6895 |
| 8 | QPSK | 446 | 0.8711 |
| 9 | QPSK | 540 | 1.0547 |
| 10 | QPSK | 296 | 1.1563 |
| 11 | 16QAM | 362 | 1.4141 |
| 12 | 16QAM | 433 | 1.6914 |
| 13 | 16QAM | 508 | 1.9844 |
| 14 | 16QAM | 585 | 2.2852 |
| 15 | 16QAM | 662 | 2.5859 |

TABLE 22

| CQI index | modulation | code rate x 1024 | efficiency |
|---|---|---|---|
| 0 | | out of range | |
| 1 | QPSK | 30 | 0.0586 |
| 2 | QPSK | 57 | 0.1113 |
| 3 | QPSK | 92 | 0.1797 |
| 4 | QPSK | 136 | 0.2656 |
| 5 | QPSK | 193 | 0.3770 |
| 6 | QPSK | 261 | 0.5098 |
| 7 | QPSK | 341 | 0.6660 |
| 8 | QPSK | 434 | 0.8477 |

TABLE 22-continued

| CQI index | modulation | code rate x 1024 | efficiency |
|---|---|---|---|
| 9 | QPSK | 528 | 1.0313 |
| 10 | QPSK | 284 | 1.1094 |
| 11 | 16QAM | 350 | 1.3672 |
| 12 | 16QAM | 421 | 1.6445 |
| 13 | 16QAM | 496 | 1.9375 |
| 14 | 16QAM | 573 | 2.2383 |
| 15 | 16QAM | 650 | 2.5391 |

In some embodiments, the CQI table may be defined as shown in Table 23 through Table 27 (the CQI tables used if the maximum modulation order is 16QAM). The CQI tables in Table 23 through Table 27 are CQI tables usable in a scenario having the identical maximum modulation order of 16QAM but different BLER targets. The terminal may determine of which table entry values are applied through the RRC configuration. The different CQI tables in Table 23 through Table 27 have the same modulation order between entries having the same CQI index, and the code rate differs by a multiple of 12. In addition, the CQI tables in Table 23 through Table 27 use eight CQI index entries in the CQI tables of Table 8 through Table 12, or change only the code rate by 12, 24, 36, or 48.

TABLE 23

| CQI index | modulation | code rate x 1024 | efficiency |
|---|---|---|---|
| 0 | | out of range | |
| 1 | QPSK | 78 | 0.1523 |
| 2 | QPSK | 102 | 0.1992 |
| 3 | QPSK | 134 | 0.2617 |
| 4 | QPSK | 173 | 0.3379 |
| 5 | QPSK | 223 | 0.4355 |
| 6 | QPSK | 284 | 0.5547 |
| 7 | QPSK | 357 | 0.6973 |
| 8 | QPSK | 438 | 0.8555 |
| 9 | QPSK | 528 | 1.0313 |
| 10 | QPSK | 624 | 1.2188 |
| 11 | 16QAM | 364 | 1.4219 |
| 12 | 16QAM | 433 | 1.6914 |
| 13 | 16QAM | 506 | 1.9766 |
| 14 | 16QAM | 583 | 2.2773 |
| 15 | 16QAM | 660 | 2.5781 |

TABLE 24

| CQI index | modulation | code rate x 1024 | efficiency |
|---|---|---|---|
| 0 | | out of range | |
| 1 | QPSK | 66 | 0.1289 |
| 2 | QPSK | 90 | 0.1758 |
| 3 | QPSK | 122 | 0.2383 |
| 4 | QPSK | 161 | 0.3145 |
| 5 | QPSK | 211 | 0.4121 |
| 6 | QPSK | 272 | 0.5313 |
| 7 | QPSK | 345 | 0.6738 |
| 8 | QPSK | 426 | 0.832 |
| 9 | QPSK | 516 | 1.0078 |
| 10 | QPSK | 612 | 1.1953 |
| 11 | 16QAM | 352 | 1.375 |
| 12 | 16QAM | 421 | 1.6445 |
| 13 | 16QAM | 494 | 1.9297 |
| 14 | 16QAM | 571 | 2.2305 |
| 15 | 16QAM | 648 | 2.5313 |

TABLE 25

| CQI index | modulation | code rate x 1024 | efficiency |
|---|---|---|---|
| 0 | | out of range | |
| 1 | QPSK | 54 | 0.1055 |
| 2 | QPSK | 78 | 0.1523 |
| 3 | QPSK | 110 | 0.2148 |
| 4 | QPSK | 149 | 0.291 |
| 5 | QPSK | 199 | 0.3887 |
| 6 | QPSK | 260 | 0.5078 |
| 7 | QPSK | 333 | 0.6504 |
| 8 | QPSK | 414 | 0.8086 |
| 9 | QPSK | 504 | 0.9844 |
| 10 | QPSK | 600 | 1.1719 |
| 11 | 16QAM | 340 | 1.3281 |
| 12 | 16QAM | 409 | 1.5977 |
| 13 | 16QAM | 482 | 1.8828 |
| 14 | 16QAM | 559 | 2.1836 |
| 15 | 16QAM | 636 | 2.4844 |

TABLE 26

| CQI index | modulation | code rate x 1024 | efficiency |
|---|---|---|---|
| 0 | | out of range | |
| 1 | QPSK | 42 | 0.082 |
| 2 | QPSK | 66 | 0.1289 |
| 3 | QPSK | 98 | 0.1914 |
| 4 | QPSK | 137 | 0.2676 |
| 5 | QPSK | 187 | 0.3652 |
| 6 | QPSK | 248 | 0.4844 |
| 7 | QPSK | 321 | 0.627 |
| 8 | QPSK | 402 | 0.7852 |
| 9 | QPSK | 492 | 0.9609 |
| 10 | QPSK | 588 | 1.1484 |
| 11 | 16QAM | 328 | 1.2813 |
| 12 | 16QAM | 397 | 1.5508 |
| 13 | 16QAM | 470 | 1.8359 |
| 14 | 16QAM | 547 | 2.1367 |
| 15 | 16QAM | 624 | 2.4375 |

TABLE 27

| CQI index | modulation | code rate x 1024 | efficiency |
|---|---|---|---|
| 0 | | out of range | |
| 1 | QPSK | 30 | 0.0586 |
| 2 | QPSK | 54 | 0.1055 |
| 3 | QPSK | 86 | 0.168 |
| 4 | QPSK | 125 | 0.2441 |
| 5 | QPSK | 175 | 0.3418 |
| 6 | QPSK | 236 | 0.4609 |
| 7 | QPSK | 309 | 0.6035 |
| 8 | QPSK | 390 | 0.7617 |
| 9 | QPSK | 480 | 0.9375 |
| 10 | QPSK | 576 | 1.125 |
| 11 | 16QAM | 316 | 1.2344 |
| 12 | 16QAM | 385 | 1.5039 |
| 13 | 16QAM | 458 | 1.7891 |
| 14 | 16QAM | 535 | 2.0898 |
| 15 | 16QAM | 612 | 2.3906 |

Herein, some entry having a high CQI index in a new CQI table additionally generated may be replaced with a reserved field.

Alternatively, some entries in the new CQI table may be allocated to a higher CQI index by a specific CQI index, and a remaining low CQI index may be newly configured to have the modulation order and the code rate having a lower spectral efficiency.

The CQI table generated in such a manner may be defined as shown in Table 28. This is a CQI table using entries corresponding to nine CQI indexes as they are in the existing CQI table. Other six entries may be set as reserved or filled with entries for supporting a lower spectral efficiency.

TABLE 28

| CQI index | modulation | code rate x 1024 | efficiency |
|---|---|---|---|
| 0 | | out of range | |
| — | — | — | — |
| — | — | — | — |
| — | — | — | — |
| — | QPSK | 78 | 0.1523 |
| — | QPSK | 120 | 0.2344 |
| — | QPSK | 193 | 0.3770 |
| — | QPSK | 308 | 0.6016 |
| — | QPSK | 449 | 0.8770 |
| — | QPSK | 602 | 1.1758 |
| — | 16QAM | 378 | 1.4766 |
| — | 16QAM | 490 | 1.9141 |
| — | 16QAM | 616 | 2.4063 |
| — | — | — | — |
| — | — | — | — |
| — | — | — | — |

In various embodiments of the present disclosure, other modulation scheme than QPSK, 16QAM, 64QAM, and 256QAM may be applied to the CQI table. For example, a pi/2-BPSK modulation scheme or 1024QAM may be further included.

The MCS may be designed and used similarly to the CQI. Notably, since the MCS, which uses more signaling bits, may have more entries of the table than the CQI. In addition, whole or part of the modulation order and the code rate defined in the CQI table may be reused in the MCS table.

The TBS may be calculated using a code rate known in the MCS. In some embodiments, the TBS may be determined by the number of the allocated REs, the number of the used layers, a transmission order, the code rate, and so on. The transmission order and the code rate of various factors which determine the TBS may be obtained through the MCS of the signaling information. In some embodiments, the modulation order obtained through the MCS may be used as it is and the code rate obtained through the MCS may be additionally adjusted according to the RRC configuration information. In some embodiments, if only an MCS table for a service of a high target BLER is defined and is set to support a service having the identical maximum modulation order through the RRS signaling but the low target BLER, a transceiver may obtain the modulation order and the code rate from the defined MCS table, and adjust and use only the code rate. A method for adjusting the code rate may adopt various methods. Among them, for example, a method for subtracting a preset constant value from the code rate may be used. In so doing, the constant value subtracted from the code rate may use the same value for every CQI index, or use a value varying according to the modulation order. In some embodiments, the code rate may be defined based on Equation 1.

$$R=f(R',P) \quad \text{Equation 1}$$

Herein, R may denote the code rate applied for the TBS calculation, R' may denote the code rate obtained from the existing table, and P may denote a service scenario or service mode related parameter obtained by the RRC configuration.

In other embodiments, the code rate may be defined as Equation 2.

$$R=f(R',P)=R'-a(P) \quad \text{Equation 2}$$

Herein, R may denote the code rate applied for the TBS calculation, R' may denote the code rate obtained from the existing table, P may denote the service scenario or service mode related parameter obtained by the RRC configuration, and a(P) may denote a constant value determined according to the service scenario or mode related parameter P. That is, Equation 1 may be expressed as R=R'-a for a predefined constant a, and the constant a may use an identical value regardless of the service scenario or mode but may achieve optimized performance by using a different value, for example, 12/1024, 24/1024, 36/1024, or 48/1024. Herein, the service scenario or mode may be defined on various bases, and may be changed according to various system requirements such as a user category, the target BLER, or the modulation order. In addition, the service scenario or mode may be determined on multiple bases in combination.

Only subtracting the specific constant value based on the code rate has been described in Equation 1, but it may be implemented in various methods. For example, the method may be implemented by setting a reference denominator value for indicating the code rate to 1024, invoking the code rate*1024 value from each CQEI or MCS table, and subtracting a particular integer constant from the value as in the CQI or MCS table according to various embodiments of the present disclosure. As an example of the method described in Equation 1, if the constant such as 12 or 24 or 36 or 46 is subtracted from the value R*1024 corresponding to an adequate code rate R, the same effect as subtracting 12/1024, 24/1024, 36/1024, or 48/1024 in Equation 1 may be achieved. As such, the application based on the code rate as expressed in Equation 1 has various methods for obtaining the same effect. In some embodiments, various embodiments of the present disclosure may be implemented by setting an adequate value corresponding to the code rate and then readjusting the adequate value corresponding to the code rate using its adequate constant value.

In some embodiments, various embodiments of the present disclosure based on Equation 1 may be implemented by designing a plurality of CQI or MCS tables as mentioned earlier. For example, in a wireless communication system applying a plurality of CQI or MCS tables, if the code rate corresponding to the same index or its corresponding values in the two CQI or MCS tables are set to exhibit a difference by a preset value, the same effect as the various embodiments of the present disclosure based on Equation 1 may be achieved.

Figure 8:
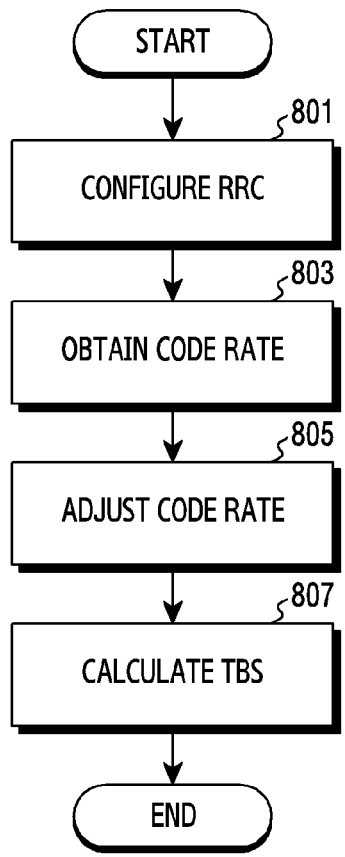
FIG. 8 illustrates a flowchart of a terminal for calculating a transport block size (TB S) using a CQI and MCS table according to various embodiments of the present disclosure.

FIG. 8 illustrates a flowchart of a terminal for calculating a TBS using a CQI and MCS table according to various embodiments of the present disclosure. FIG. 8 illustrates an operating method of the terminal 120.

Referring to FIG. 8 a base station (e.g., the base station 110) signals RRC to the terminal by considering a service to be provided to the terminal. In step 801, the terminal performs RRC configuration. In step 803, the terminal obtains a code rate and a transmission order which are a reference. In step 805, the terminal adjusts the code rate if a service defined in the RRC configuration is different from a reference service. A specific method for acquiring the code rate and the transmission order, and a method for adjusting the code rate conform to various embodiments of the present disclosure. The terminal calculates a TBS using the adjusted code rate in step 807.

Figure 9:
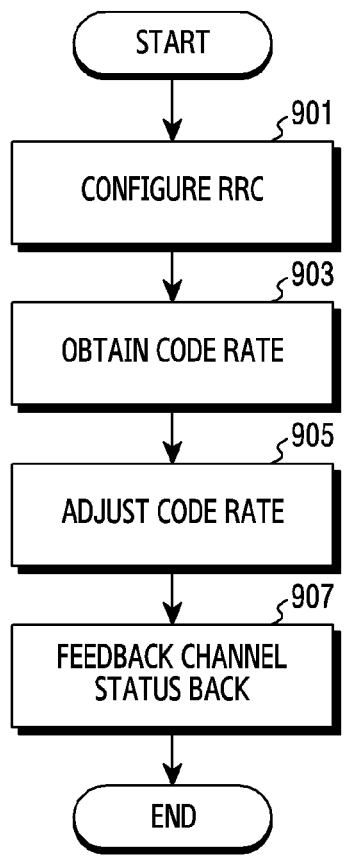
FIG. 9 illustrates another flowchart of a terminal for calculating a TBS using a CQI and MCS table according to various embodiments of the present disclosure.

FIG. 9 illustrates another flowchart of a terminal for calculating a TBS using a CQI and MCS table according to various embodiments of the present disclosure. FIG. 9 illustrates an operating method of the terminal 120.

Referring to FIG. 9, a base station (e.g., the base station 110) signals RRC to the terminal by considering a service to be provided to the terminal. In step 901, the terminal performs RRC configuration. In step 903, the terminal obtains a code rate and a transmission order which are a reference. In step 905, the terminal adjusts the code rate if a service defined in the RRC configuration is different from a reference service. A specific method for acquiring the code rate and the transmission order, and a method for adjusting the code rate conform to various embodiments of the present disclosure. In step 907, the terminal feeds back a channel status using the adjusted code rate.

In some embodiments, the base station 110 and the terminal 120 may communicate using at least one of wireless communication and wired communication.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

What is claimed is:
1. A method performed by a user equipment (UE) in a wireless communication system, the method comprising:
receiving, from a base station (BS), configuration information related to a plurality of channel quality indicator (CQI) tables via a radio resource control (RRC) signaling, wherein the plurality of CQI tables includes:
a first CQI table corresponding to a first block error rate (BLER), 0.1, and
a second CQI table corresponding to a second BLER, 0.00001;
identifying a CQI index from the second CQI table in case that the configuration information indicates the second CQI table; and
transmitting, to the BS, the identified CQI index,
wherein a first CQI index of the first CQI table indicates a first modulation scheme and a first code rate,
wherein a second CQI index of the second CQI table indicates the first modulation scheme and the first code rate, and
wherein the first CQI index is lower than the second CQI index.

2. The method of claim 1,
wherein the first CQI table includes a plurality of CQI indices,
wherein the second CQI table includes the plurality of CQI indices, and
wherein the plurality of CQI indices includes a first CQI index expressed as (quadrature phase shift keying (QPSK), 78/1024), a second CQI index expressed as (QPSK, 120/1024), a third CQI index expressed as (QPSK, 193/1024), a fourth CQI index expressed as (QPSK, 308/1024), a fifth CQI index expressed as (QPSK, 449/1024), a sixth CQI index expressed as (QPSK, 602/1024), a seventh CQI index expressed as (16-QAM, quadrature amplitude modulations, 378/1024), an eighth CQI index expressed as (16-QAM, 490/1024), and nineth CQI index expressed as (16-QAM, 616/1024).

3. The method of claim 1, further comprising, in case that the one of the plurality of CQI tables is the second CQI table, receiving, from the BS, a transport block with an error probability not exceeding the second BLER.

4. The method of claim 1, wherein the second CQI table is configured to include a lower spectral efficiency than the first CQI table in a same index.

5. The method of claim 1, wherein the first CQI table and the second CQI table include a same maximum modulation order.

6. A user equipment (UE) in a wireless communication system, comprising:
at least one transceiver; and
at least one processor operably coupled to the at least one transceiver,
wherein the at least one processor is configured to:
receive, from a base station (BS), configuration information related to a plurality of channel quality indicator (CQI) tables via a radio resource control (RRC) signaling,
wherein the plurality of CQI tables includes:
a first CQI table corresponding to a first block error rate (BLER), 0.1, and
a second CQI table corresponding to a second BLER, 0.00001,
identify a CQI index from the second CQI table in case that the configuration information indicates the second CQI table, and
transmit, to the BS, the identified CQI index,
wherein a first CQI index of the first CQI table indicates a first modulation scheme and a first code rate,
wherein a second CQI index of the second CQI table indicates the first modulation scheme and the first code rate, and
wherein the first CQI index is lower than the second CQI index.

7. The UE of claim 6,
wherein the first CQI table includes a plurality of CQI indices,
wherein the second CQI table includes the plurality of CQI indices, and
wherein the plurality of CQI indices includes a first CQI index expressed as (quadrature phase shift keying (QPSK), 78/1024), a second CQI index expressed as (QPSK, 120/1024), a third CQI index expressed as (QPSK, 193/1024), a fourth CQI index expressed as (QPSK, 308/1024), a fifth CQI index expressed as (QPSK, 449/1024), a sixth CQI index expressed as (QPSK, 602/1024), a seventh CQI index expressed as (16-QAM, quadrature amplitude modulations, 378/1024), an eighth CQI index expressed as (16-QAM, 490/1024), and nineth CQI index expressed as (16-QAM, 616/1024).

8. The UE of claim 6, wherein the at least one processor is further configured to:
in case that the one of the plurality of CQI tables is the second CQI table, receive, from the BS, a transport block with an error probability not exceeding the second BLER.

9. The UE of claim 6, wherein the second CQI table is configured to include a lower spectral efficiency than the first CQI table in a same index.

10. The UE of claim 6, wherein the first CQI table and the second CQI table include a same maximum modulation order.

11. A method performed by a base station (BS) in a wireless communication system, the method comprising:
transmitting, to a user equipment (UE) configuration information related to a plurality of channel quality indicator (CQI) tables via a radio resource control (RRC) signaling,
wherein the plurality of CQI tables includes:
a first CQI table corresponding to a first block error rate (BLER), 0.1, and
a second CQI table corresponding to a second BLER, 0.00001; and
receiving, from the UE, a CQI index,
wherein a first CQI index of the first CQI table indicates a first modulation scheme and a first code rate,
wherein a second CQI index of the second CQI table indicates the first modulation scheme and the first code rate, and
wherein the first CQI index is lower than the second CQI index.

12. The method of claim 11,
wherein the first CQI table includes a plurality of CQI indices,
wherein the second CQI table includes the plurality of CQI indices, and
wherein the plurality of CQI indices includes a first CQI index expressed as (quadrature phase shift keying (QPSK), 78/1024), a second CQI index expressed as (QPSK, 120/1024), a third CQI index expressed as (QPSK, 193/1024), a fourth CQI index expressed as (QPSK, 308/1024), a fifth CQI index expressed as (QPSK, 449/1024), a sixth CQI index expressed as (QPSK, 602/1024), a seventh CQI index expressed as (16-QAM, quadrature amplitude modulations, 378/1024), an eighth CQI index expressed as (16-QAM, 490/1024), and nineth CQI index expressed as (16-QAM, 616/1024).

13. The method of claim 11, further comprising, in case that the one of the plurality of CQI tables is the second CQI table, transmitting, to the UE, a transport block with an error probability not exceeding the second BLER.

14. The method of claim 11, wherein the second CQI table is configured to include a lower spectral efficiency than the first CQI table in a same index.

15. The method of claim 11, wherein the first CQI table and the second CQI table include a same maximum modulation order.

16. A base station (BS) in a wireless communication system, the BS comprising:
at least one transceiver; and
at least one processor operably coupled to the at least one transceiver,
wherein the at least one processor is configured to:
transmit, to a user equipment (UE) configuration information related to a plurality of channel quality indicator (CQI) tables via a radio resource control (RRC) signaling,
wherein the plurality of CQI tables includes:
a first CQI table corresponding to a first block error rate (BLER), 0.1, and
a second CQI table corresponding to a second BLER, 0.00001; and
receive, from the UE, a CQI index,
wherein a first CQI index of the first CQI table indicates a first modulation scheme and a first code rate,
wherein a second CQI index of the second CQI table indicates the first modulation scheme and the first code rate, and
wherein the first CQI index is lower than the second CQI index.

17. The BS of claim 16,
wherein the first CQI table includes a plurality of CQI indices,
wherein the second CQI table includes the plurality of CQI indices, and
wherein the plurality of CQI indices includes a first CQI index expressed as (quadrature phase shift keying (QPSK), 78/1024), a second CQI index expressed as (QPSK, 120/1024), a third CQI index expressed as (QPSK, 193/1024), a fourth CQI index expressed as (QPSK, 308/1024), a fifth CQI index expressed as (QPSK, 449/1024), a sixth CQI index expressed as (QPSK, 602/1024), a seventh CQI index expressed as (16-QAM, quadrature amplitude modulations, 378/1024), an eighth CQI index expressed as (16-QAM, 490/1024), and nineth CQI index expressed as (16-QAM, 616/1024).

18. The BS of claim 16, wherein the at least one processor is configured to, in case that the one of the plurality of CQI tables is the second CQI table, transmit, to the UE, a transport block with an error probability not exceeding the second BLER.

19. The BS of claim 16, wherein the second CQI table is configured to include a lower spectral efficiency than the first CQI table in a same index.

20. The BS of claim 16,
wherein the first CQI table and the second CQI table include a same maximum modulation order.

* * * * *